(12) United States Patent
Yamada (10) Patent No.: US 7,631,329 B1
(45) Date of Patent: Dec. 8, 2009

(54) INFORMATION PROCESSING APPARATUS, INFORMATION PROCESSING METHOD AND A MEDIUM

(75) Inventor: Isao Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 847 days.

(21) Appl. No.: 09/610,773

(22) Filed: Jul. 6, 2000

(30) Foreign Application Priority Data

Jul. 15, 1999 (JP) .............................. P11-201256

(51) Int. Cl.
| | |
|---|---|
| G06F 3/00 | (2006.01) |
| G06F 13/00 | (2006.01) |
| H04N 5/445 | (2006.01) |
| H04N 7/10 | (2006.01) |
| H04N 7/025 | (2006.01) |

(52) U.S. Cl. ..................... 725/40; 725/43; 725/44; 725/51; 725/60; 725/61; 725/32; 725/42; 715/718; 715/726

(58) Field of Classification Search ................. 725/57, 725/38–39, 40, 43–45, 51, 53, 60, 61; 715/716, 715/718, 726

See application file for complete search history.

(56) References Cited

U.S. PATENT DOCUMENTS

| | | | | |
|---|---|---|---|---|
| 5,532,735 | A * | 7/1996 | Blahut et al. ................... | 725/32 |
| 5,561,708 | A * | 10/1996 | Remillard .................... | 725/110 |
| 5,774,664 | A * | 6/1998 | Hidary et al. ................ | 725/110 |
| 5,905,865 | A * | 5/1999 | Palmer et al. ................ | 725/112 |
| 6,005,562 | A * | 12/1999 | Shiga et al. ................... | 725/43 |
| 6,064,376 | A * | 5/2000 | Berezowski et al. ........... | 725/42 |
| 6,133,912 | A * | 10/2000 | Montero ...................... | 715/716 |
| 6,177,931 | B1 * | 1/2001 | Alexander et al. ............ | 725/52 |
| 6,219,837 | B1 * | 4/2001 | Yeo et al. ....................... | 725/38 |
| 6,263,503 | B1 * | 7/2001 | Margulis ...................... | 725/81 |
| 6,400,407 | B1 * | 6/2002 | Zigmond et al. ............ | 348/465 |
| 6,405,371 | B1 * | 6/2002 | Oosterhout et al. ........... | 725/39 |

(Continued)

FOREIGN PATENT DOCUMENTS

JP 08-051405 2/1996

(Continued)

OTHER PUBLICATIONS

Japanese Office Action issued on May 13, 2009, for corresponding Japanese Patent Application 11-201256.

*Primary Examiner*—Joseph G Ustaris
(74) *Attorney, Agent, or Firm*—K&L Gates LLP (57) ABSTRACT

In a television broadcasting system intended to present information pertaining to a main broadcast program to viewers, a ground-wave broadcast station produces and broadcasts the main program in the conventional manner and a CS (communication satellite) broadcast station which is supplied with main program composition information and various source data from the ground-wave station produces supplemental broadcast programs for the main program. The CS station also produces symbolic labels indicative of the content of the supplemental programs, and broadcasts the supplemental programs and symbolic labels together. An IRD (integrated receiver/decoder) unit of a viewer's receiver set receives the broadcast signals from the ground-wave station and CS station, and displays the main program and the symbolic labels of supplemental programs together on a display unit. The IRD unit operates in response to the selection of a symbolic label by the viewer to display a supplemental program corresponding to this symbolic label.

16 Claims, 6 Drawing Sheets

U.S. PATENT DOCUMENTS

| | | | |
|---|---|---|---|
| 6,510,553 B1 * | 1/2003 | Hazra | 725/87 |
| 6,553,178 B2 * | 4/2003 | Abecassis | 725/101 |
| 6,698,020 B1 * | 2/2004 | Zigmond et al. | 725/34 |
| 2002/0007493 A1 * | 1/2002 | Butler et al. | 725/109 |
| 2003/0135852 A1 * | 7/2003 | Kamemoto | 725/32 |

FOREIGN PATENT DOCUMENTS

| | | |
|---|---|---|
| JP | 09-093505 | 4/1997 |
| JP | 09-093549 | 4/1997 |
| JP | 09-182037 | 7/1997 |
| JP | 10-066040 | 3/1998 |

* cited by examiner

INFORMATION PROCESSING APPARATUS, INFORMATION PROCESSING METHOD AND A MEDIUM

BACKGROUND OF THE INVENTION

1. Field of the Invention

The present invention relates to an information processing apparatus, information processing method and a medium, and particularly to an information processing apparatus, information processing method and a medium which are useful for a broadcasting system intended for the broadcast of programs which supplement a main television (TV) program for example.

2. Description of the Related Art

In recent years, satellite televisions (based on broadcasting satellites and communication satellites) and cable televisions (CATVs) are prevailing, and these TV broadcasts have a growing number of channels.

The TV broadcast contains a variety of programs including dramas, news, sports and advertisements (commercials). A TV viewer who watches a commercial program and intends to known advertised commodities in more detail is obliged to get catalogs or other publications which describe the commodities.

A conceivable scheme of providing the viewer with information pertaining to the content of a program of one channel (e.g., detailed information on commodities which are introduced in a commercial program) is to broadcast that information on another channel.

The broadcast of information related to a main program which is broadcast on one channel supplements the main program in a sense, and accordingly it will be called "supplemental broadcast" for the main broadcast. Namely, the main broadcast contains a main program, and the supplemental broadcast contains supplemental programs.

However, due to different channels of the main broadcast and supplemental broadcast, the viewer who intends to get the related information of the main program needs to remember the channel of supplemental broadcast, and is obliged to switch the channel from the main broadcast to the supplemental broadcast awkwardly.

SUMMARY OF THE INVENTION

The present invention is intended to cope with the foregoing related art situation, and its prime object is to enable TV viewers to make easy access to information pertaining to a main broadcast program for example.

The present invention resides in a first information processing apparatus which includes a symbolic label forming means which forms small display frames of symbols (will be termed "symbolic labels" hereinafter) indicative of the content of broadcast programs, and a transmission means which transmits the broadcast programs and symbolic labels.

The broadcast programs can be programs which supplement other broadcast program.

The broadcast programs and symbolic labels and the other broadcast program can be transmitted on separate transmission paths.

The broadcast programs can be composed of data which is different from data adapted for video or audio output.

The broadcast programs can be composed of data adapted for printout.

The transmission means is operative to alter the transmission band for transmitting the broadcast programs and symbolic labels depending on the quantity of data of broadcast programs and symbolic labels to be transmitted.

The first information processing apparatus can further include an information appending means which appends, to the symbolic labels, display control information for controlling as to whether or not the symbolic labels are displayed on a receiver set which receives the broadcast programs and symbolic labels.

The present invention also resides in a first information processing method which includes a symbolic label forming step of forming symbolic labels indicative of the content of broadcast programs, and a transmission step of transmitting the broadcast programs and symbolic labels.

The present invention also resides in a first medium which operates on a computer to run an operation program, which includes a symbolic label forming step of forming symbolic labels indicative of the content of broadcast programs, and a transmission step of transmitting the broadcast programs and symbolic labels.

The present invention also resides in a second information processing apparatus which includes a reception means which receives broadcast programs and symbolic labels, a display control means which operates on a display device to display the symbolic labels, and an output control means which operates in response to the operation of selection of a symbolic label to release data of a broadcast program corresponding to the selected symbolic label.

The second information processing apparatus can further include a control means which controls as to whether or not the symbolic labels are displayed.

In case a symbolic label has the appendage of display control information for controlling as to whether or not the symbolic label is displayed, the control means is operative to control as to whether or not the symbolic label is displayed in accordance with the display control information.

The reception means is operative to receive other broadcast program, and the display control means is operative to display the symbolic labels together with the other broadcast program.

The output control means is responsive to the operation of selection of a symbolic label to display a broadcast program corresponding to the selected symbolic label in place of the other broadcast program.

The display control means can operate on separate display devices to display the other broadcast program and the symbolic labels.

In case a broadcast program is composed of data adapted for printout, the output control means can operate on a printing device to print the printout data.

The second information processing apparatus can further include a memory means which operates in response to the operation of selection of a symbolic label to store data of a broadcast program corresponding to the selected symbolic label, and the output control means can operate on the memory means to release the stored data of the broadcast program.

In case a broadcast program is composed of data adapted for ordering a commodity, the output control means is operative to transmit the order data.

The present invention also resides in a second information processing method which includes a reception step of receiving broadcast programs and symbolic labels, a display control step of controlling a display device to display the symbolic labels, and an output control step of controlling, in response to the operation of selection of a symbolic label, the release of data of a broadcast program corresponding to the selected symbolic label.

The present invention also resides in a second medium which operates on a computer to run an operation program, which includes a reception step of receiving broadcast programs and symbolic labels, a display control step of controlling a display device to display the symbolic labels, and an output control step of controlling, in response to the operation of selection of a symbolic label, the release of data of a broadcast program corresponding to the selected symbolic label.

In the first information processing apparatus, first information processing method and first medium based on this invention, symbolic labels indicative of the content of broadcast programs are formed, and the broadcast programs and symbolic labels are transmitted.

In the second information processing apparatus, second information processing method and second medium based on this invention, broadcast programs and symbolic labels are received, and the symbolic labels are displayed on a display device. In response to the operation of selection of a symbolic label, data of a broadcast program corresponding to the selected symbolic label is released.

DESCRIPTION OF THE PREFERRED EMBODIMENTS

Figure 1:
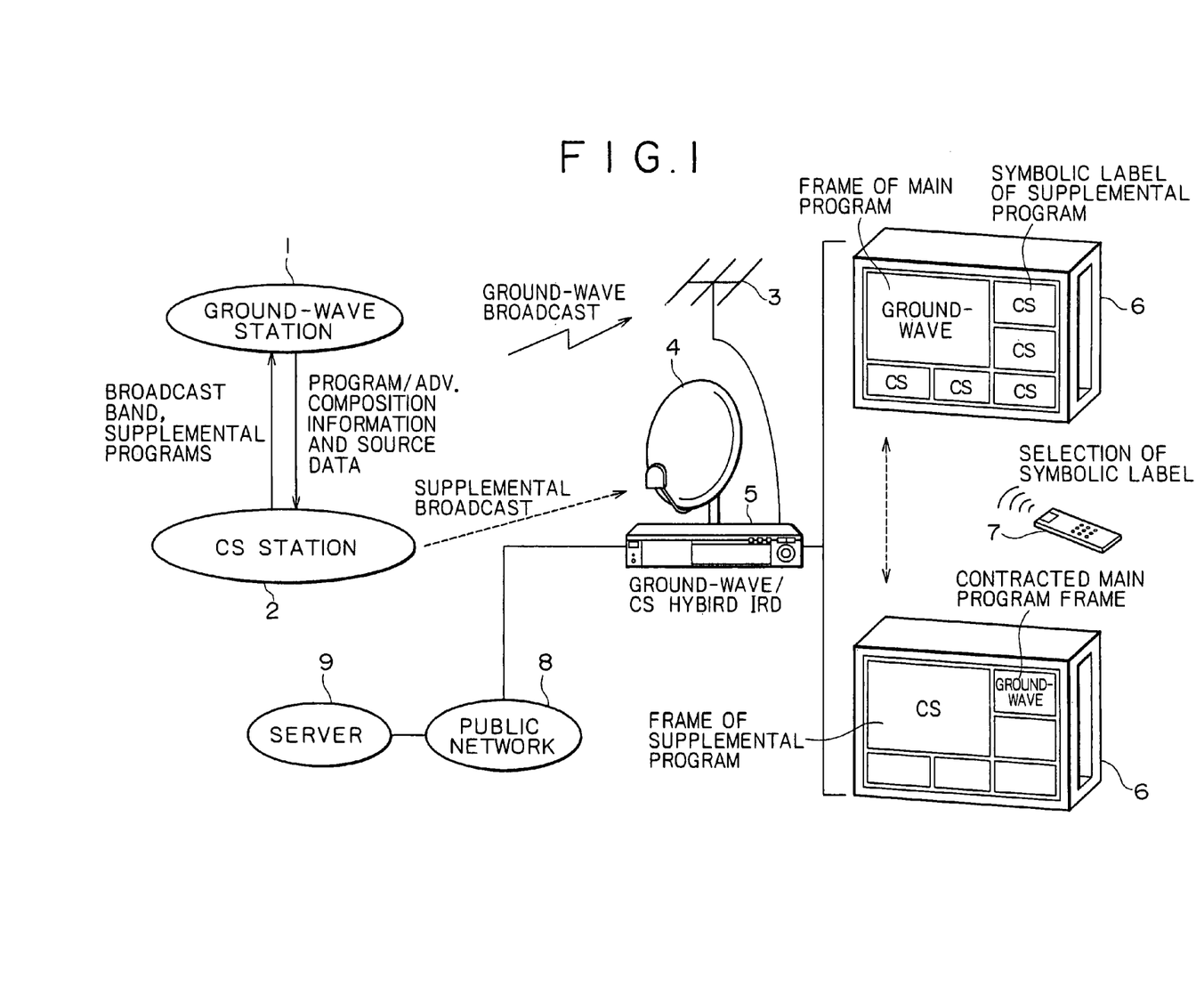
FIG. 1 is a diagram showing the organization of a broadcasting system based on an embodiment of this invention.

FIG. 1 shows the organization of a broadcasting system based on an embodiment of this invention. In the system, a ground-wave broadcast station 1 produces a main broadcast program and broadcasts the main program by using a ground wave in the conventional manner. A communication satellite (CS) broadcast station 2 produces supplemental broadcast programs for the main broadcast program of the ground-wave station 1 and broadcasts the supplemental programs by using a CS digital broadcast wave.

Specifically, the ground-wave station 1 supplies main program composition information and various source data to the CS station 2, which uses these information and data to produce supplemental programs. The CS station 2 has the allotment of a transmission band used to broadcast the supplemental programs via the satellite communication circuit.

The CS station 2 produces supplemental programs as follows.

Supplemental programs for an advertisement program (commercial) of a commodity or entertainment, for example, are designed to include information on the details of the product, information on the campaign, promotion video, names of performers appearing in the main program, titles of music used in the main program, ordering guide used to request a catalog or sample, and a map around the store or showroom.

Supplemental programs for a dramatic program, for example, are designed to include a diagram showing the personal relation in the drama, texts or images of scenes for briefing the preceding part of the drama, names and other information of performers, titles of music used in the drama, and commodities related to the drama (original novel, sound track record, video tape, etc.)

Supplemental programs for a sports program, for example, are designed to include highlight events of the game in progress, scores of teams and team members, images, scores and results of other games in the same or other stadiums, images of trailing runners in a marathon or stage relay game, and close-up shots of managers, coaches and players.

Other supplemental programs are designed to include texts or images for introducing the main program which is about to be broadcast by the ground-wave station, maps around the stores which are introduced in the main program, information on foods, and images for inviting viewers to join in a quiz.

The CS station 2 further produces symbolic labels indicative of the content of the supplemental programs (labels are still or moving pictures with sound or text which symbolize the supplemental programs), and these symbolic labels are broadcast together with the supplemental programs.

For a supplemental program intended to explain the details of a commodity, for example, a symbolic label is produced by inclusion of a logogram or icon of the commodity. Symbolic labels may be either still pictures or moving pictures.

The radio wave of main broadcasting by the ground-wave station 1 and the radio wave of supplemental broadcasting by the CS station 2 are received by antennas 3 and 4, respectively, which are attached to a viewer's receiver set, and these input radio waves are fed to a ground-wave/CS hybrid IRD (integrated receiver and decoder) unit 5 of the receiver set.

The IRD unit 5 which receives the radio waves from the antennas 3 and 4 releases image signals to a display unit 6. The display unit 6 displays both of a frame of main program and symbolic labels of supplemental programs together, relieving the viewer of the need of switching between the ground-wave and satellite broadcasts.

Specifically, the display unit 6 displays a main program of ground-wave broadcast in a large screen area of the top-left section and displays symbolic labels of satellite (CS) broadcast in a screen area of the bottom and right-extreme section. The viewer is aware of the service of supplemental broadcast by seeing the symbolic labels. In the embodiment of FIG. 1, there are shown five symbolic labels displayed in the bottom and right-extreme section of the screen of the display unit 6.

Instead of the display of the main program frame and symbolic labels arrayed in the divided screen areas of the display unit 6 as explained above, it is also possible to superimpose the symbolic labels on the frame of main program which extends across the entire screen area of the display unit 6.

It is also possible to display a main program and symbolic labels on separate display devices, instead of displaying these frame and labels on the same display unit 6 as in this embodiment. For example, a main program is displayed on the display unit 6 and symbolic labels are displayed on the screen of a personal computer.

The display unit 6 is designed to display a cursor which is shaped to surround a symbolic label. The cursor can be moved from one symbolic label to another by operating a remote-control input device 7. The viewer who has positioned the cursor to a certain symbolic label operates the input device 7 to choose the symbolic label, and the supplemental program corresponding to that symbolic label is displayed.

Alternatively, the cursor is designed to move around all symbolic labels continuously, and the viewer operates the input device 7 at a symbolic label pointed by the cursor thereby to choose it, and the supplemental program corresponding to that symbolic label is displayed.

When a symbolic label is selected, the supplemental program corresponding to it is displayed in the large screen area in place of the main program of ground-wave broadcast. In addition, the display unit 6 displays a contracted frame of the main program in the area where the selected symbolic label has been displayed for example.

With the cursor being positioned to the contracted frame of the main program, if the viewer operates the input device 7 to choose it, the display unit 6 displays the main program in the large screen area in place of the supplemental program, and displays the symbolic label of that supplemental program in the area where the contracted main program has been displayed, i.e., the display unit 6 restores the original state of display.

With a supplemental program corresponding to one symbolic label being displayed, if the viewer selects another symbolic label, the display unit 6 switches the content of display in the same manner as explained above.

Accordingly, the viewer who does not known the affair of CS broadcast for the supplemental broadcast and does not known the channel (frequency band) of this broadcast can watch the supplemental program by simply selecting a symbolic label displayed on the display unit 6 in the same fashion as browsing through home pages of the Internet (i.e., in the manner of clicking the mouse device at the linked portion). The viewer can easily return to the main program after the watching of the supplemental program.

Since symbolic labels are designed to indicate the content of corresponding supplemental programs, the viewer can associate a symbolic label with a relevant supplemental program in choosing the supplemental program.

Consequently, based on the broadcast of a main program of the advertisement (commercial) for a commodity and the broadcast of a supplemental program which explains the commodity in detail together with an associated symbolic label, it is possible for the viewer to get the detailed information on the advertised commodity immediately.

The viewer who watches the main program of commercial and gets interested in the advertised commodity can known the service of a supplemental program for the commodity at once by browsing through symbolic labels. When the viewer selects the relevant symbolic label, the display unit 6 displays the corresponding supplemental program which explains the details of the commodity as mentioned above, enabling the viewer to get detailed information on the advertised commodity.

Namely, the viewer who has been merely watching a main program of commercial in a unidirectional fashion will be enabled to get detailed information of advertised commodities in an interactive fashion in the advent of the supplemental broadcast.

Since the supplemental broadcast is based on the satellite link which is separate from the ground-wave transmission circuit of the main broadcast, the ground-wave station 1 can operate the broadcasting without altering the facility. Accordingly, it becomes possible for the operator of the ground-wave station 1 to offer at a low cost the service of supplemental programs to viewers having the IRD unit 5 by merely providing the operator of the CS station 2 with information used to produce supplemental programs. The operator of the ground-wave station 1 can present ground-wave broadcast programs invariably to viewers who have conventional receiver sets without the IRD unit 5.

Supplemental programs broadcast through the satellite communication channel which has a wide transmission band can include huge video data (still and moving pictures) and audio data.

It is also possible to carry out the supplemental broadcast by utilizing the blanking period of the main TV broadcast signal, as in the case of the literal broadcast, or by using a vacant frequency band of the ground wave, although it is difficult in these cases to have a video and audio supplemental broadcast due to a narrow frequency band available.

Supplemental programs are intended to provide viewers with data for requesting catalogs or samples of commodities as mentioned previously. When the viewer has selected a symbolic label of a supplemental program, the IRD unit 5 makes access to a server 9 of the advertiser of the commodity to instruct the request of catalog or sample of the commodity through a certain transmission path, e.g., public network 8, in accordance with the provided data.

Specifically, the IRD unit 5 sends information, inclusive of the name and address of the viewer who requests a catalog or sample and the identification (ID) code of the commodity which is retrieved from the provided data, to the server 9. The server 9 stores and analyzes the information sent from the IRD unit 5, and proceeds to the task of delivering the requested catalog or sample to the viewer.

Supplemental programs may include data for collecting viewer's opinions on the main program (e.g., the popularity of a main program of commercial) and surveying the popularity of performers. In this case, a supplemental program displays items of inquiry, and the input for the inquiry times entered by the viewer with the input device 7 is sent to the server 9, ground-wave station 1 or CS station 2 via the public network 8 for example.

The transmission path used by the IRD unit 5 for sending a request of catalog, etc. to the server 9 can be a wired circuit or wireless circuit and can be a public network as adopted in this embodiment or a leased line. This transmission path can be a telephone line connected to the IRD unit 5 for the PPV (pay per view) service offered by the CS station 2 based on the CS digital broadcast.

The viewer's name and address to be sent to the server 9 at the request of catalog, etc. may be entered by the viewer at each request, or these data may be stored in an internal memory (not shown) of the IRD unit 5 and sent automatically to the server 9 at each request of catalog, etc. Alternatively, if the viewer is a subscriber of the satellite TV broadcast, CATV, Internet, etc., and has one's name, address and ID code of IRD unit 5 registered to the operator's database, etc., it is possible for the IRD unit 5 to send its ID code so that the server 9 searches the database for the viewer's name and address based on the ID code.

Symbolic labels of supplemental programs, which are displayed together with a main program in the example of FIG. 1, may be displayed only when the viewer operates the input device 7 to display labels for example. In this case, however, symbolic labels are absent at the beginning of the watching of a main program, and the viewer does not aware of the service of supplemental programs. For coping with this matter, it is possible to indicate the presence or absence of supplemental programs within the frame of main program based on the ground-wave literal broadcast for example.

For a main program of the advertisement of commodities and associated supplemental programs for the detailed explanation of the commodities, it is desirable for the advertiser (or sponsor) to display the symbolic labels of the supplemental programs always together with the main program. On this account, the system may be designed to display symbolic labels always together with a main program.

The system may also be designed to reduce the subscription fee of the CS digital broadcast of the CS station 2 in response to the viewer's selection of a symbolic label of a supplemental program for the advertisement of a commodity so as to promote the viewer's access to the service of supplemental programs.

The system may be designed to enable the viewer to tune and watch a supplemental program in the same manner as a program of the usual CS digital broadcast, or enable the viewer to watch the supplemental program only after the selection of the relevant symbolic label.

The system may be designed to display a supplemental program immediately following the selection of the relevant symbolic label, or store the supplemental program in an internal memory (not shown) of the IRD unit 5 so that the viewer can watch it afterward.

Supplemental programs do not necessarily pertain to a main program. Instead, supplemental programs may be programs which are broadcast on channels different from the main broadcast channel, or may be previews of programs which will be broadcast on other channels. Supplemental programs of previews may include control data for the recording of associated main programs on a video tape recorder (VTR), etc. In response to the selection of a supplemental program, the control data is sent to the VTR so that it is reserved to record the program.

Next, the operation of the ground-wave station 1, CS station 2 and IRD unit 5 will be explained in more detail with reference to FIG. 2.

The ground-wave station 1 produces a main program and broadcasts the program by using a ground wave in the conventional manner. This ground wave is received by the antenna 3 of a receiver set, and it is fed to the IRD unit 5. In FIG. 2, the ground-wave station 1 is broadcasting the main program as main broadcasting which includes a video part V-0 and audio part A-0.

The ground-wave station 1 supplies main program composition information and various source data to the CS station 2, which uses these information and data to produce supplemental programs. In the CS station 2, data from the ground-wave station 1 is conducted through a selector/controller 11 and stored temporarily in a database 12 or video recording/playback unit 13. The data is retrieved from the database 12 or video recording/playback unit 13 and conducted through the selector/controller 11 to an authoring system/encoder 14, which implements the authoring of supplemental programs. The authoring system/encoder 14 also produces symbolic labels of the supplemental programs and other data necessary for the supplemental broadcast.

In case the source data provided by the ground-wave station 1 is data for a live broadcasting program or the program which is being broadcast currently or data to be transmitted on a real-time basis (e.g., data for a subordinate program or video data from multiple video cameras in a sports program) this incoming data is fed directly for authoring to the authoring system/encoder 14 via the selector/controller 11.

Figure 2:
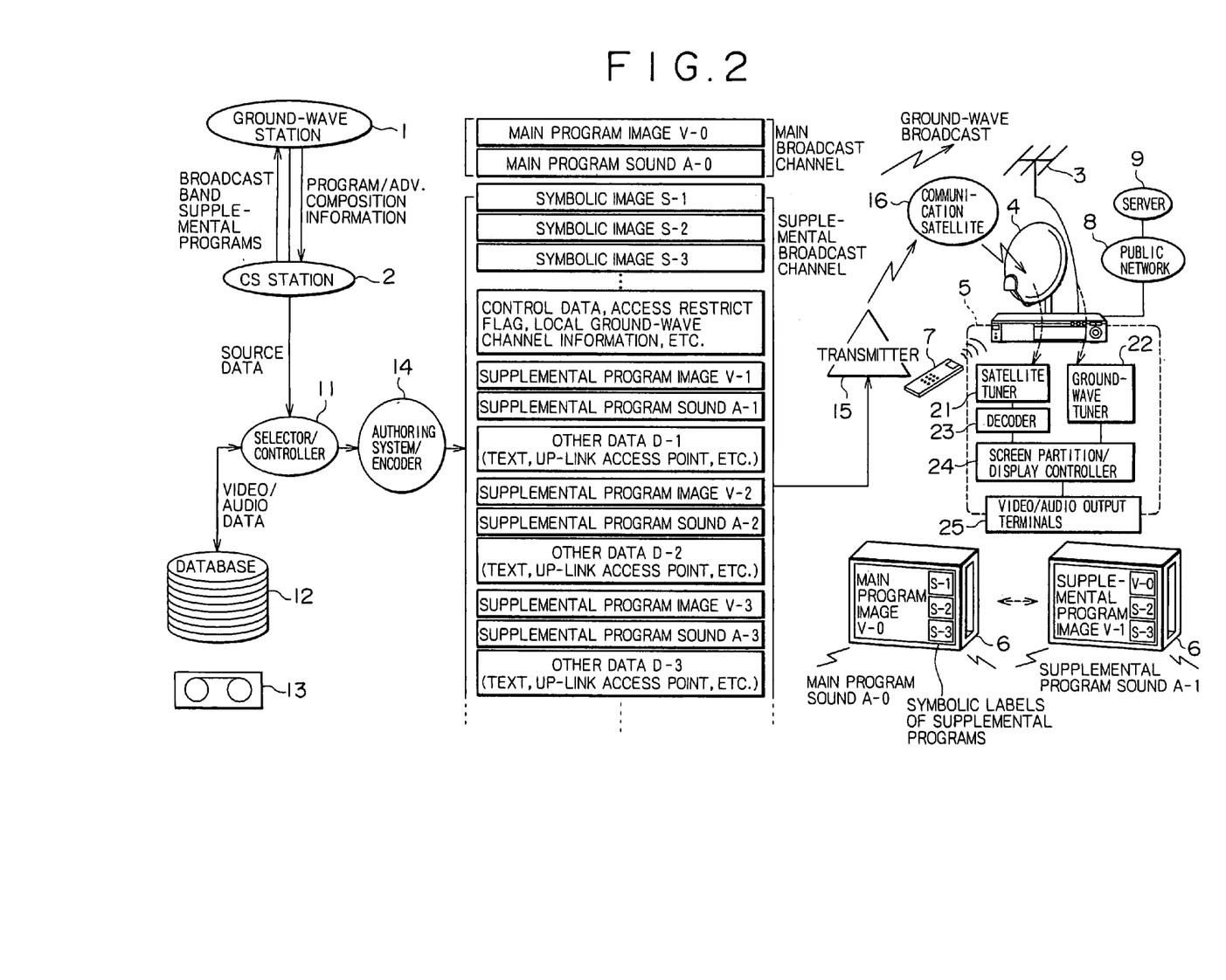
FIG. 2 is a diagram used to explain the operation of the broadcasting system shown in FIG. 1.

In FIG. 2, data for the supplemental broadcast includes a video part (symbolic image) S-1 which forms a symbolic label for a supplemental program #1, a video part S-2 which forms a symbolic label for a supplemental program #2, a video part S-3 which forms a symbolic label for a supplemental program #3, and so on, control data, access restrict flag, local ground-wave channel information, a video part (supplemental program image) V-1 and audio part (supplemental program sound) A-1 of the supplemental program #1, other data (e.g., telephone number of the server 9 and text information) D-1, video part V-2 and audio part A-2 of the supplemental program #2 and accompanying data D-2, video part V-3 and audio part A-3 of the supplemental program #3 and accompanying data D-3, and so on.

The control data and access restrict flag are used by the IRD unit 5 to control the display (release) of symbolic labels and supplemental programs.

The symbolic label of each supplemental program can be displayed together with main programs of multiple ground-wave broadcast channels. Specifically, a symbolic label which is displayed together with a main program of a ground-wave channel A can also be displayed together with a main program of another ground-wave channel B. However, if main programs of channels A and B have different sponsors, it is not desirable to display a symbolic label of a supplemental program for one channel A (B) of one sponsor together with the main program of another channel B (A) of another sponsor. The IRD unit 5 implements display control for dealing with this matter (filtering of symbolic labels and supplemental programs) in accordance with the control data.

The control data further includes, for example, information on the determination of the combination of symbolic labels of supplemental programs and main programs of ground-wave broadcast channels to be displayed together. Accordingly, it is possible to use symbolic labels of supplemental programs commonly for main programs of multiple broadcast channels, enabling the more efficient use of frequency bands and lower operation cost as compared with the production and broadcast of supplemental programs and symbolic labels separately for individual main broadcast channels.

The control data can further include, when necessary, information on local broadcast stations which belong to each key station of ground-wave broadcast. The key station and local stations have different broadcast channels in general, and the control data defines the relationship of these chain stations for the IRD unit 5. The IRD unit 5 makes reference to the control data of station correspondence in response to the selection of a program of one key station, and selects to display automatically programs of chained local stations having service areas which cover the viewer's residential location.

Ground-wave broadcast channels which can be received by the IRD unit 5 at the viewer's residential location can be set automatically besides the manual setting by the viewer. Specifically, for example, if the viewer has one's telephone number, address, Zip code, and ID code of IRD unit 5 registered to the center station, the IRD unit 5 determines the viewer's residential location from the ID code and establishes ground-wave broadcast channels that the viewer can access.

Among supplemental programs, there can be cases where, for example, parents think certain programs be kept away from children, or sponsors hope to present certain programs to viewers of certain areas or families having primary school children. For these cases, the access restrict flag is used by the IRD unit 5 to enable or disable (i.e., filtering) the release of symbolic labels and supplemental programs. In case the CS station 2 has information on viewers having IRD units or IRD units with specific ID codes, the access restrict flag can be made from that information.

The authoring system/encoder 14, which has produced data for the supplemental broadcast, scrambles the data when necessary and conducts the data to a transmitter 15. The transmitter 15 allots a broadcasting frequency band (transmission rate) to the data provided by the authoring system/ encoder 14. Specifically, for example, the transmitter 15 allots frequency bands in accordance with such a broadcasting schedule that the supplemental broadcast for ground-wave channel A uses channel-a of the CS digital broadcast during a time band from 7 to 9 hour, the supplemental broadcast for ground-wave channel B uses channel-a of the CS digital broadcast during a time band from 9 to 10 hour.

The transmitter 15 is designed to increase frequency bands temporarily, e.g., reserves channel-b in addition to channel-a of the CS digital broadcast, in response to the increase of data of supplemental broadcast caused by a sudden demand of supplemental broadcast from the ground-wave station 1.

Therefore, the operator of the ground-wave station 1 does not need to reserve frequency bands for the supplemental broadcast permanently, but can solely rely on the operator of the CS station 2. Accordingly, for example, the supplemental broadcast for even a small part of a main program can take place at a relatively low cost.

Based on the capability of flexible allotment of frequency band to the supplemental broadcast as mentioned above, it becomes possible to enhance the quality of a popular main program and effectiveness of advertisement used in the main program by allotting many frequency bands to the supplemental broadcast for the main program.

The transmitter 15 allots a frequency band to the data provided by the authoring system/encoder 14, establishes the control data and access restrict flag when necessary, and transmits the data in the form of radio wave. The radio wave relayed by a communication satellite 16 is received by the antenna 4 of the viewer's receiver set and fed to the IRD unit 5.

The IRD unit 5 incorporates a satellite tuner 21, a ground-wave tuner 22, a decoder 23, a screen partition/display controller (will be termed simply "controller") 24, and video/audio terminals (will be termed "output terminals") 25. The radio wave signals received by the antennas 3 and 4 are fed to the satellite tuner 21 and ground-wave tuner 22, respectively.

The satellite tuner 21 extracts data of supplemental programs, and the decoder 23 decodes the data provided by the tuner 21. Specifically, the decoder 23 decodes supplemental program data of MPEG (moving picture expert group), XML (extensible markup language), MHEG (multimedia hypermedia expert group), etc. The decoder 23 gives the supplemental program data to the controller 24 after the descrambling process when necessary.

The ground-wave tuner 22 extracts data of ground-wave program and gives it to the controller 24.

Figure 3:
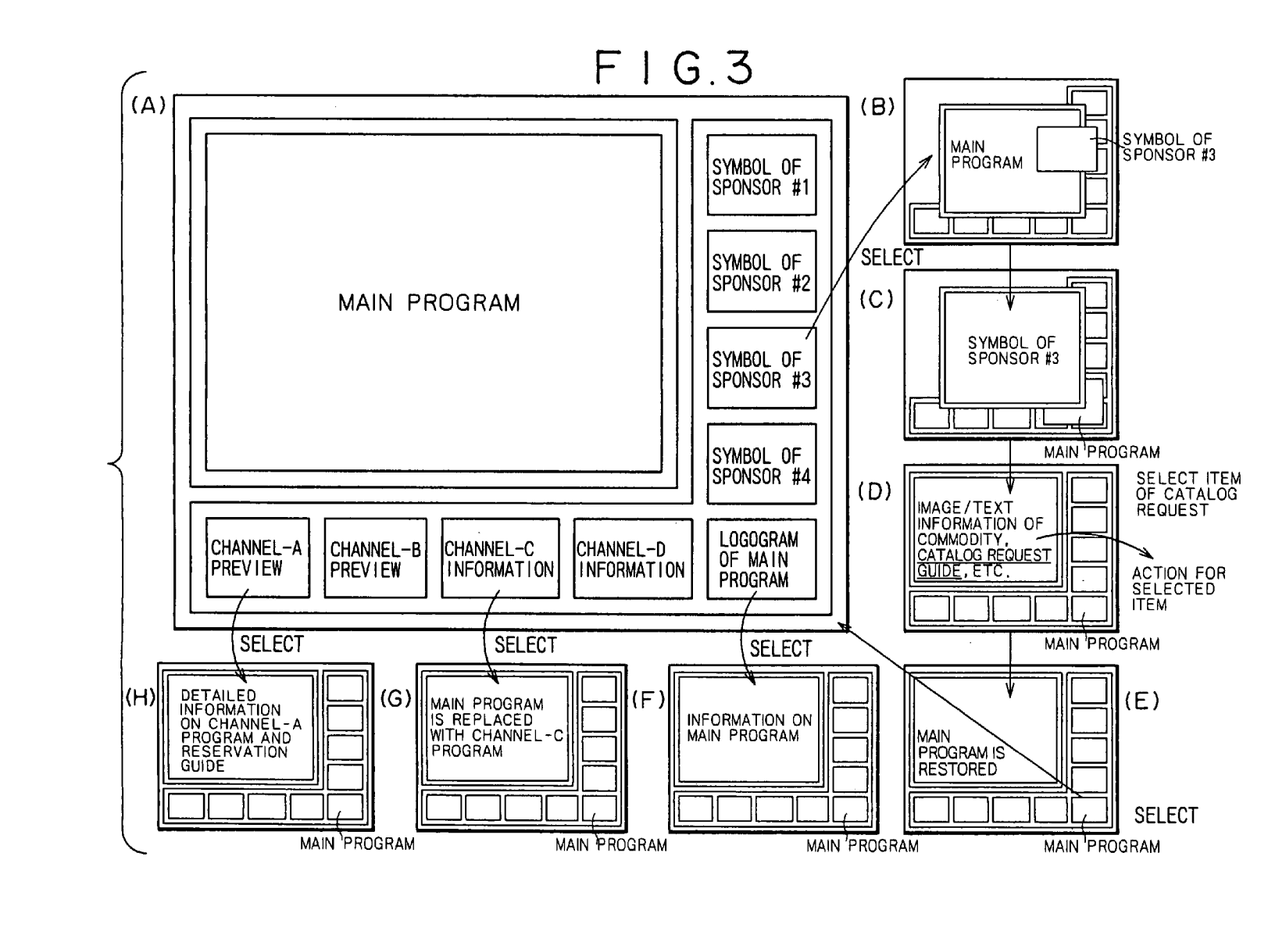
FIG. 3 is a diagram showing an example of display on the display unit 6 shown in FIG. 1 and FIG. 2.

The controller 24 produces a screen image to be displayed on the display unit 6 from the main program provided by the ground-wave tuner and the symbolic labels of supplemental programs provided by the satellite tuner 21, and delivers the image signal via the output terminal 25 to the display unit 6, which then displays the screen image as shown in FIG. 3 for example.

Specifically, when the viewer tunes in to the main program of ground-wave broadcast by operating the input device 7, the display unit 6 displays the main program in the larger screen area at the top-left section and symbolic labels in the screen area of the bottom and right-extreme section as shown by (A) in FIG. 3.

In the example of (A) in FIG. 3, the display unit 6 displays symbolic labels of supplemental programs which explain commodities brought out by sponsors #1 through #4 of main programs, symbolic labels of supplemental programs which are previews of main programs on ground-wave channels A and B, symbolic labels pertaining to main programs on ground-wave channels C and D (or contracted frames of the main programs on the ground-wave channels C and D), and a symbolic label which is a logogram of the main program displayed currently in the large screen area.

In the display state of (A), when the viewer operates the input device 7 to select the symbolic label for the supplemental program of sponsor #3 for example, this symbolic label moves while expanding gradually to the large screen area where the main program has been displayed as shown by (B) and (C) in FIG. 3, and subsequently the symbolic label is replaced with the corresponding supplemental program as shown by (D). At the same time, the frame of main program moves while contracting gradually to the area of symbolic label of its logogram.

The example of display shown by (D) in FIG. 3 of the supplemental program for the selected symbolic label includes a picture and text which explain the details of the commodity brought out by the sponsor #3 and guide the viewer to request a catalog of the commodity.

In the display state of (D), when the viewer operates the input device 7 to select the contracted frame of main program as shown by (E) for example, the display unit 6 restores the original display shown by (A).

In the display state of (A), when the viewer operates the input device 7 to select the symbolic label of the logogram of main program for example, information pertaining to the main program (names of performers, etc.) is displayed in place of the main program as shown by (F).

In the display state of (A), when the viewer selects the symbolic label of the supplemental program for the main program on ground-wave channel C for example, the main program of channel C replaces the current main program as shown by (G).

In the display state of (A), when the viewer selects the symbolic label of the supplemental program for the preview of the main program of ground-wave channel A for example, detailed information on the channel-A program and the guidance for the switching of display to that program at the start of the program is displayed in place of the current main program as shown by (H).

Figure 4:
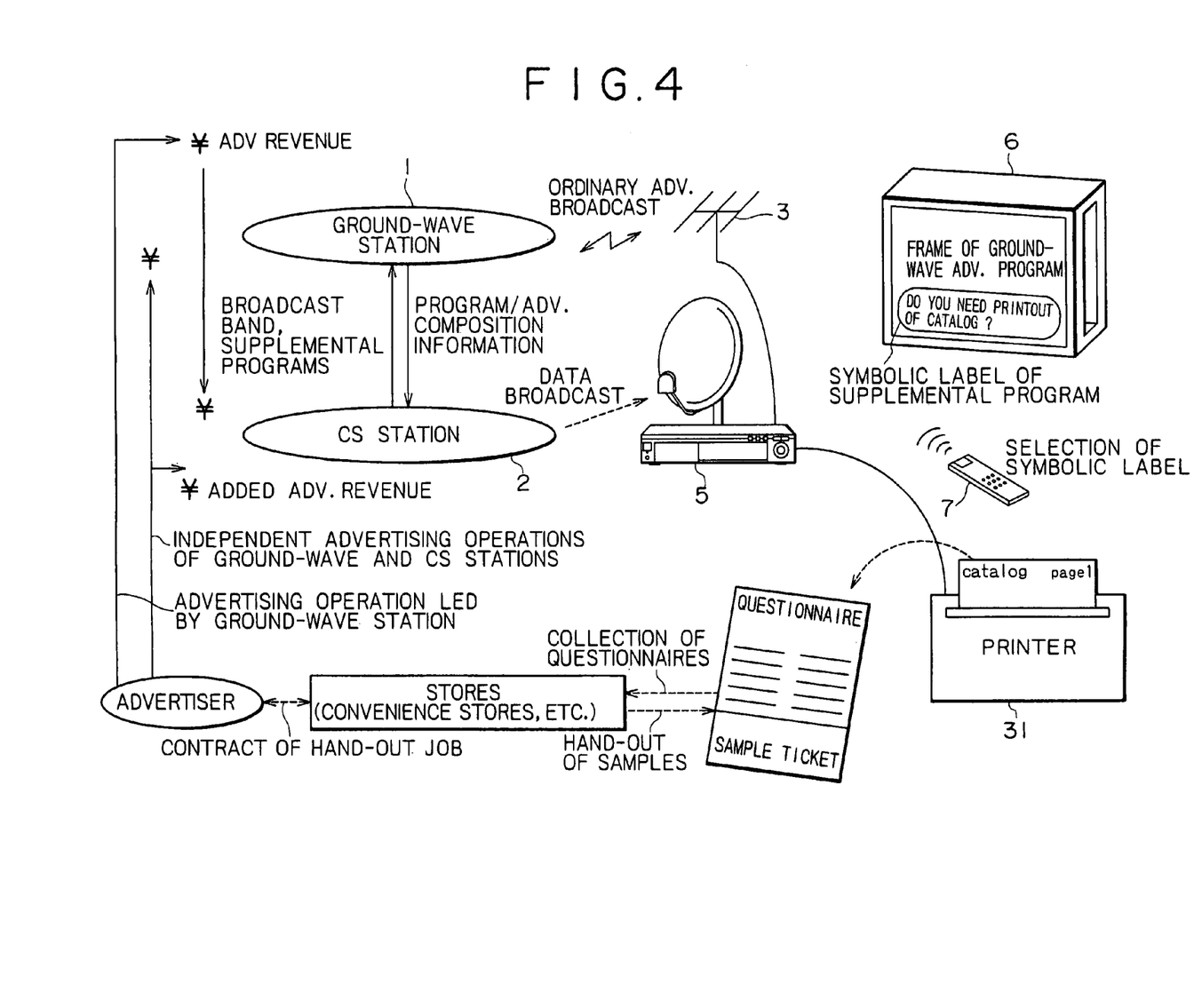
FIG. 4 is a diagram showing the organization of a broadcasting system based on another embodiment of this invention.

FIG. 4 shows the organization of a broadcasting system based on another embodiment of this invention. In the figure, items identical to those of the preceding embodiment of FIG. 1 are referred to by the same symbols, and explanation thereof will not be repeated.

The ground-wave station 1 broadcasts an advertising program of commodities for an advertiser (or sponsor) as in the case of the preceding embodiment of FIG. 1. The CS station 2 broadcasts supplemental programs which are data (printout data) for printing catalogs, questionnaire forms, tickets of samples, etc. for the commodities.

In case the ground-wave station 1 takes control in advertising commodities of an advertiser, the operator of the station 1 can collect advertisement fees from the advertiser and share the revenue with the operator of the CS station 2. In another case, where the operators of the ground-wave and CS stations 1 and 2 perform the advertisement of commodities of an advertiser independently, the operators of the ground-wave and CS stations 1 and 2 can collect advertisement fees from the advertiser independently.

The main program of the ground-wave station 1 and the supplemental programs and accompanying symbolic labels of the CS station 2 are broadcast and received by the IRD unit 5 of receiver set in the same manner as the preceding embodiment. The main program and symbolic labels are displayed together on the display unit 6.

In the example shown in FIG. 4, a symbolic label which contains a literal message "Do you need printout of catalog?", for example, is displayed by being superimposed on the main program of commercial.

The IRD unit 5 is connected to a printer 31, and when the viewer operates the input device 7 to point that symbolic label, catalog data of the supplemental program is printed on the printer 31. Similarly, the printer 31 can print an questionnaire form, ticket of sample, etc. of the advertised commodity in accordance with the printout data.

In consequence, the viewer who is watching the main program and interested in an advertised commodity can get a catalog, sample ticket, etc. immediately. On the other hand, the advertiser can inform the details of the commodity to the viewer immediately when the viewer gets interested in it, and can profit from the enhanced effectiveness of advertisement by the main ground-wave program.

This commodity advertising scheme is much efficient in terms of the concentration of catalog delivery to users who are really interested in the commodity in contrast to the distribution of catalogs to users based on the direct mail, etc.

Moreover, the advertiser does not need to print a certain number of catalog sheets by anticipating the demand and store the printed catalog sheets. The advertiser can save the man-power for mailing and lower the price of commodity in proportion to the cost-down.

Moreover, the advertiser can revise the content of catalog by simply altering the printout data of the supplemental program which is broadcast by the CS station 2.

The advertiser who accepts the payment for the purchase of the printer 31, print paper, ink, etc., will promote the viewer's access to this service. The advertiser who contracts with many stores, e.g., convenience stores, to hand out samples of commodities to viewers having sample tickets which have been printed with the printer 31 will save the expenditure and man-power for handling sample commodities.

The store keeper who prints questionnaire sheets with the printer 31 and collects the sheets entered by users can known users who got catalogs or samples. Although it is possible to survey concerns of the user directly on the display unit 6, the user is obliged to operate the input device 7 to enter the questionnaire, and this scheme is more awkward for the user as compared with entering the questionnaire. Moreover, in this case, in contrast to the use of questionnaire sheet, data entered with the input device 7 by the user must be sent to the advertiser via the public network 8 at the user's expense unfavorably.

The printout data may be adapted to print out traffic tickets, amusement tickets, etc. besides catalogs and questionnaire sheets.

Supplemental programs may contain data which can be down-loaded to a certain recording medium, e.g., memory card, besides printout data, so that the user having data on the recording medium can get a sample of commodity at the store.

The foregoing system operation can be implemented either on a hardware basis or software basis. In the latter case, an operation program is installed in a computer, etc.

Figure 5A:
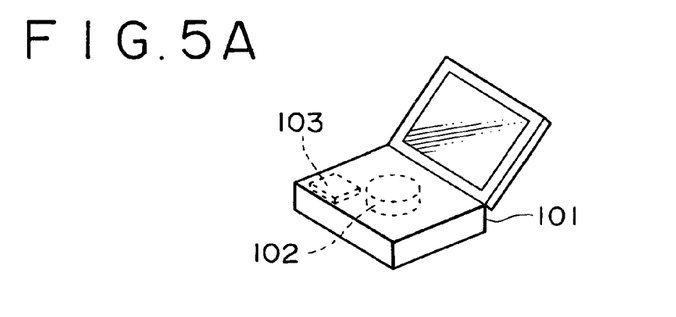
FIGS. 5A, 5B and 5C are diagrams used to explain mediums based on this invention.
Figure 5B:
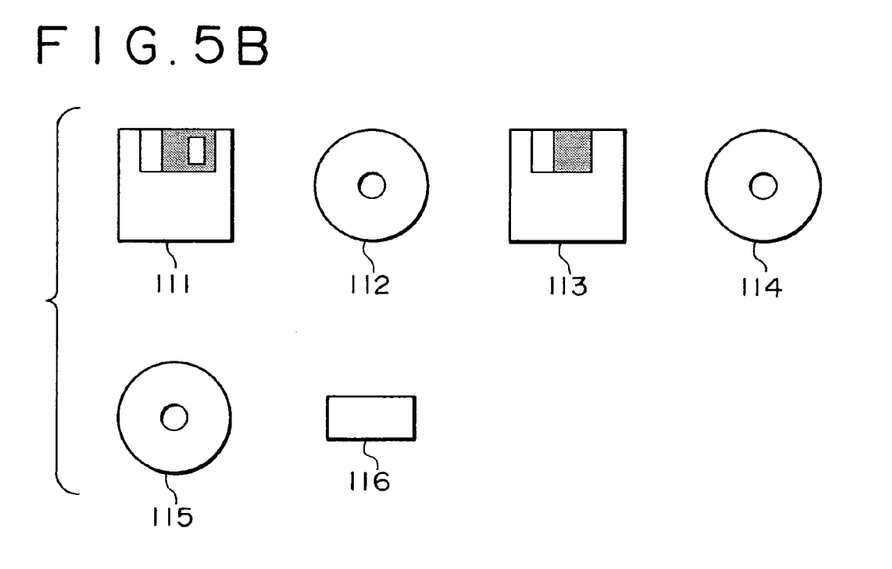
Figure 5C:
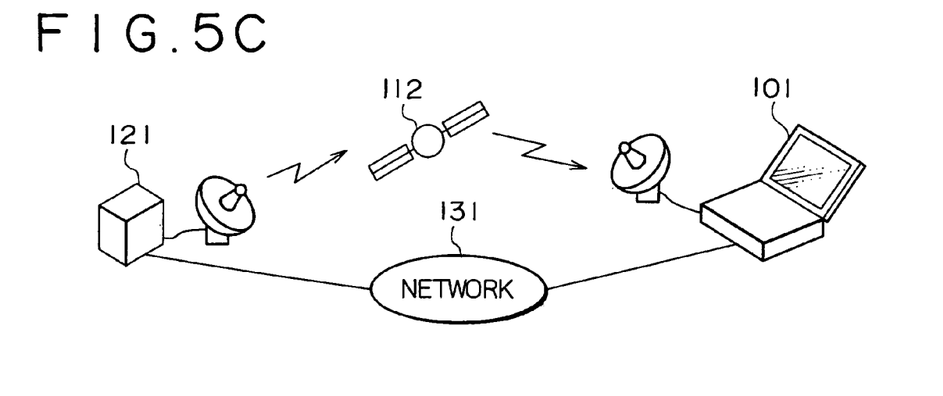

The following explains with reference to FIGS. 5A to 5C a medium which is used to install the operation program in the computer which implements the operation.

The operation program can be supplied to the viewer by being stored in advance on a hard disk 102 or in a semiconductor memory 103 built in a computer 101 as shown in FIG. 5A.

The operation program can also be supplied to the viewer by being stored on a floppy disk 111, CD-ROM (compact disc read-only memory) 112, MO (magneto-optical) disk 113, DVD (digital versatile disk) 114, magnetic disk 115, semiconductor memory 116, etc. as shown in FIG. 5B.

As shown in FIG. 5C, the operation program can also be supplied to the viewer by being transmitted from a download facility 121 to the computer 101 via a digital broadcasting satellite 122 or through a network 131, e.g., Internet, and stored on the hard disk 102, etc. of the computer 101.

The medium mentioned here comprehends all of these recording means.

The operation program supplied by being recorded on a medium is not necessarily in the form of a series of sequential processing steps, but it can be a set of object program modules which are executed separately or concurrently.

Figure 6:
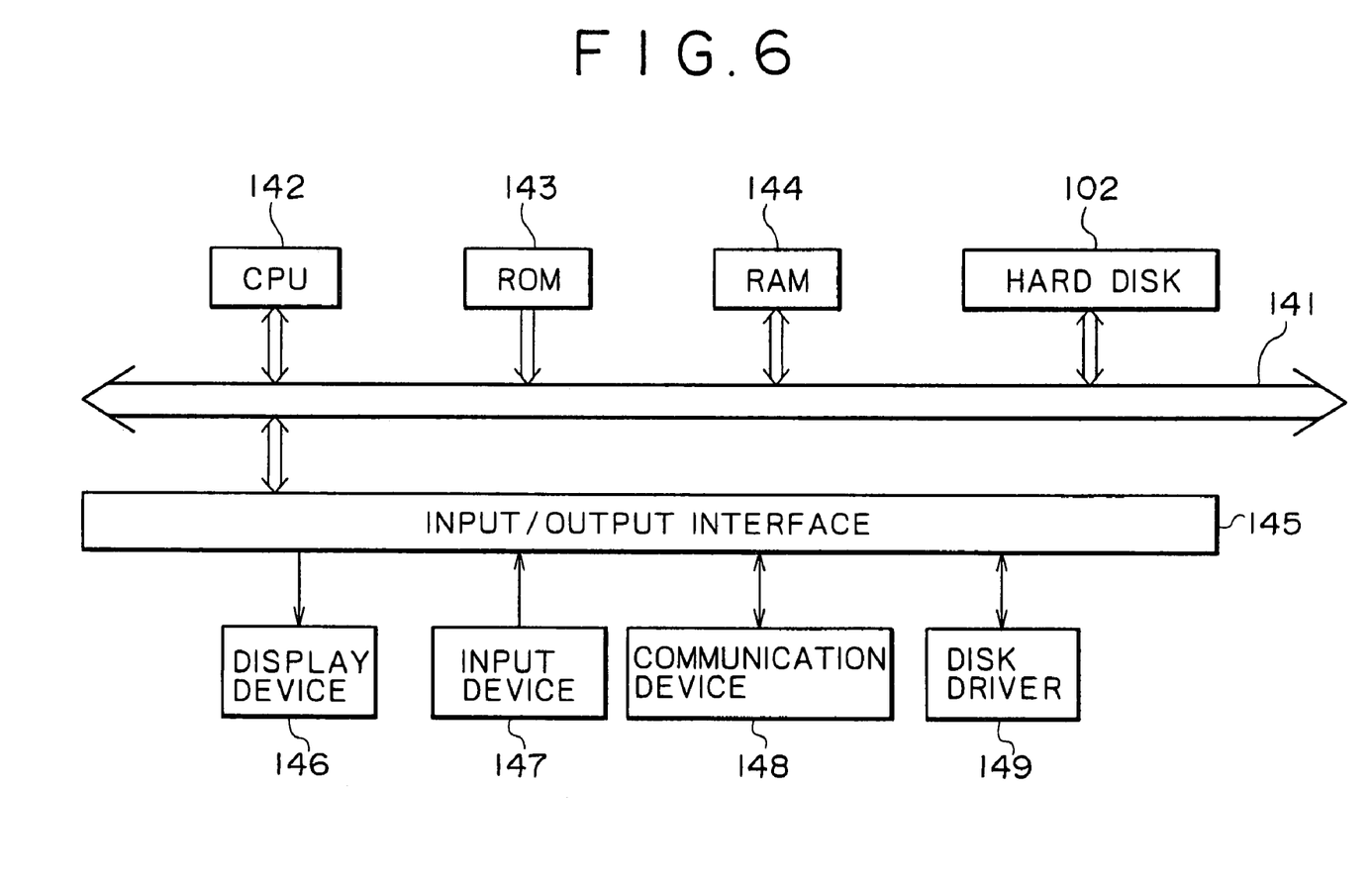
FIG. 6 is a block diagram showing an example of the arrangement of the computer 101 shown in FIGS. 5A to 5C.

FIG. 6 shows an example of the arrangement of the computer 101 shown in FIG. 5. The computer 101 includes a CPU (central processing unit) 142, which is connected with an input/output interface 145 through a bus 142.

The CPU 142 responds to a viewer's command input through the input/output interface 145 from an input device 147 like a keyboard or mouse device to execute the operation program which is stored in a ROM (read-only memory) 143 which is the semiconductor memory 103 shown in FIG. 5A. Alternatively, the CPU 142 loads the operation program, which is stored on the hard disk 102, or transmitted via the satellite 122 or network 131, received by a communication device 148 and installed on the hard disk 102, or read out of the floppy disk 111, CD-ROM 112, MO disk 113, DVD 114 or magnetic disk 115 and installed on the hard disk 102, into a RAM (random access memory) 144, and executes the program. The CPU 142 releases the result of program execution via the input/output interface 145 to a display device 146 like a LCD (liquid crystal display) panel appropriately.

Although, in the foregoing embodiments, the main broadcast and supplemental broadcast are based on the groundwave and satellite communication circuits, respectively, both broadcasts may use the same transmission path. The main broadcast and supplemental broadcast may be based on arbitrary transmission schemes, i.e., use of either digital circuit or analog circuit and use of either communication satellite or broadcasting satellite. The main broadcast and supplemental broadcast may otherwise use the Internet, CATV network, or frequency bands of radio or TV broadcast for example.

Although, in the foregoing embodiments, only supplemental programs are accompanied by symbolic labels, an alternative scheme is to provide symbolic labels irrespective of the main broadcast or supplemental broadcast, so that any program is displayed by the selection of a relevant symbolic label.

Although, in the foregoing embodiments, the main broadcast and supplemental broadcast are received by the IRD unit, a receiving device may be built in a set-top-box, TV receiver, VTR which incorporates the tuner, computer which incorporates the tuner, etc. In this case, the viewer can watch main and supplemental broadcast programs by simply connecting a conventional TV receiver to this equipment. The receiving device of main and supplemental broadcasts can be accomplished at a low cost for the viewer without the need of an expensive circuit board of PC (personal computer) or a dedicated TV receiver, but by adding the inexpensive groundwave tuning function to a conventional digital satellite broadcast tuner, for example, and installing the operation program in it.

According to the first information processing apparatus, first information processing method and first medium based on this invention, symbolic labels indicative of the content of broadcast programs are formed, and the broadcast programs and symbolic labels are transmitted. In consequence, the viewer can easily get information on a main broadcast program or the like.

According to the second information processing apparatus, second information processing method and second medium based on this invention, broadcast programs and symbolic labels are received, and the symbolic labels are displayed on a display device. With a symbolic label being selected, data of the broadcast program corresponding to this symbolic label is released to the display device. In consequence, the viewer can easily get information on a main broadcast program or the like.

What is claimed is:

1. An information processing apparatus comprising:
   first reception means which receives television programs via a first transmission path, the first transmission path including a ground-wave broadcast;
   second reception means which receives supplementary information via a second transmission path, the second transmission path including a communication satellite broadcast;
   display control means which operates a display device to display a specified television program received by the first reception means in a first region of the display device and a plurality of symbolic images in a second region of the display device, each symbolic image indicating a kind of supplementary information received by the second reception means, the display control means configured to absolve a user from switching between the ground-wave and satellite broadcasts;
   selection means for selecting a symbolic image from the plurality of the symbolic images;
   wherein in response to the selection of said symbolic image, the display control means controls to display an animation effect by:
      (a) moving and resizing the displayed selected symbolic image from the second region to the first region;
      (b) moving and resizing the displayed specified television program from the first region to the second region, wherein:
         (i) said movement and resizing from the second region to the first region; and
         (ii) said movement and resizing from the first region to the second region occur simultaneously;
      (c) for a point in time when said simultaneous movement and resizing occurs, simultaneously displaying:
         (i) at least a portion of said displayed selected symbolic image at a position; and
         (ii) at least a portion of said displayed specified television program at said position, wherein when said display control means controls said animation effect by simultaneously displaying said portion of said displayed selected symbolic image and said portion of said portion of said displayed specified television program at said position: (i) said portion of the displayed selected symbolic image overlays said displayed specific television program; or (ii) said displayed specific television program overlays said portion of the displayed selected symbolic image; and
   wherein:
      (a) said symbolic image is resized to fit within a space in the first region previously occupied by the specified television program; and
      (b) said specified television program is resized to fit within a space in the second region previously occupied by the symbolic image.

2. The information processing apparatus of claim 1, further comprising access means which accesses a server to obtain further data related to the supplementary information.

3. The information processing apparatus of claim 1, wherein the first region is a larger screen area at a top section of the display device.

4. The information processing apparatus of claim 1, wherein the second region is a smaller screen area at a bottom section of the display device.

5. The information processing apparatus of claim 1, the supplementary information including user residential location information, the display control means operating the display device to display the plurality of symbolic images based the user residential location information.

6. The information processing apparatus of claim 1, the supplementary information including an access restrict flag, the display control means operating the display device to prevent display of the plurality of symbolic images based the access restrict flag.

7. The information processing apparatus of claim 1, further comprising a recording medium in connection with the display device, wherein the recording medium stores the supplementary information in internal memory in response to the selection of the symbolic image.

8. The information processing apparatus of claim 1, wherein the display control means controls to display the supplementary information indicated by the selected symbolic image in place of the selected symbolic image in the first region.

9. The information processing apparatus of claim 1, wherein said moving and resizing said displayed selected symbolic image from said second region to said first region includes expanding said displayed selected symbolic image from said second region to said first region.

10. The information processing apparatus of claim 1, wherein said moving and resizing said displayed specified television program from said first region to said second region includes contracting said displayed television program from said first region to said second region.

11. An information processing method comprising the steps of:
   receiving television programs via a first transmission path, the first transmission path including a ground-wave broadcast;
   receiving supplementary information via a second transmission path, the second transmission path including a communication satellite broadcast;
   controlling a display device to display a specified television program received via the first transmission path in a first region of the display device and a plurality of symbolic images in a second region of the display device, each symbolic image indicating a kind of supplementary information received via the second transmission path, and controlling the display device such that a user is absolved from switching between the ground-wave and satellite broadcasts;
   selecting a symbolic image from the plurality of the symbolic images; and
   displaying an animation effect by:
      (a) moving and resizing the displayed selected symbolic image from the second region to the first region;
      (b) moving and resizing the displayed specified television program from the first region to the second region, wherein:
         (i) said movement and resizing from the second region to the first region; and (ii) said movement and resizing from the first region to the second region occur simultaneously;

(c) for a point in time when said simultaneous movement and resizing occurs, simultaneously displaying:

(i) at least a portion of said displayed selected symbolic image at a position; and (ii) at least a portion of said displayed specified television program at said position, wherein when simultaneously displaying said portion of said displayed selected symbolic image and said portion of said displayed specified television program at said position: (i) said portion of the displayed selected symbolic image overlays said displayed specific television program; or (ii) said displayed specific television program overlays said portion of the displayed selected symbolic image; and wherein:

(a) said symbolic image is resized to fit within a space in the first region previously occupied by the specified television program; and (b) said specified television program is resized to fit within a space in the second region previously occupied by the symbolic image.

12. The information processing method of claim 11, further comprising the step of accessing a server to obtain further data related to the supplementary information.

13. The information processing method of claim 11, wherein the controlling step controls to display the supplementary information indicated by the selected symbolic image in place of the selected symbolic image in the first region.

14. The information processing method of claim 11, the supplementary information including user residential location information, further comprising the step of controlling the display device to display the plurality of symbolic images based the user residential location information.

15. The information processing method of claim 11, the supplementary information including an access restrict flag, further comprising the step of controlling the display device to prevent display of the plurality of symbolic images based the access restrict flag.

16. The information processing method of claim 11, a recording medium being in connection with the display device, and further comprising the step of storing the supplementary information in internal memory of the recording medium in response to the selection of the symbolic image.

* * * * *